No. 643,835. Patented Feb. 20, 1900.
F. VALENTINER.
PROCESS OF MAKING FLUOROFORM.
(Application filed May 4, 1899.)
(No Model.)
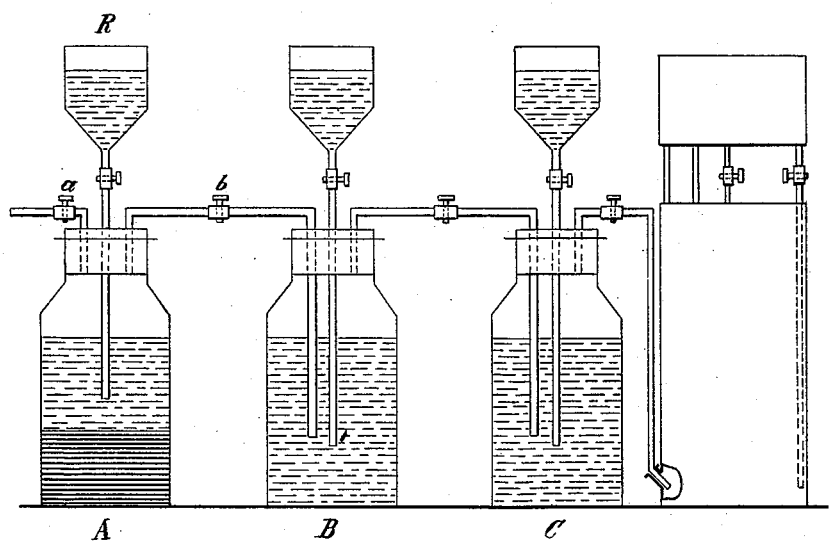
Witnesses:
Chas. Herbert
Fred. H. E. Davis
Inventor:
Friedrich Valentiner
by Harold Binney
Atty.
THE NORRIS PETERS CO., PHOTO-LITHO., WASHINGTON, D. C.

UNITED STATES PATENT OFFICE.

FRIEDRICH VALENTINER, OF LEIPSIC, GERMANY.

PROCESS OF MAKING FLUOROFORM.

SPECIFICATION forming part of Letters Patent No. 643,835, dated February 20, 1900.

Application filed May 4, 1899. Serial No. 715,570. (No specimens.)

*To all whom it may concern:*

Be it known that I, FRIEDRICH VALENTINER, a subject of the King of Saxony, residing at Leipsic-Plagwitz, in the Kingdom of Saxony, Germany, have invented certain new and useful Improvements in the Production of Fluoroform, (for which I have applied for patents in England, dated April 6, 1899, No. 7,244, and in Belgium, dated April 7, 1899, No. 111,370,) of which the following is a specification.

The only method mentioned in chemical technical literature for producing fluoroform is that described by Meslans and which is based upon the reaction of fluorid of silver and iodoform in the presence of chloroform. According to this method of Meslans two parts each of iodoform and fluorid of silver are brought into a small well-cooled retort with one part of chloroform and slowly heated. The resulting fluoroform is led through a long leaden tube cooled to 23° centigrade and then over fluorid of silver at 100° centigrade. The fluoroform is collected over mercury and freed from carbonic oxid by cuprous chlorid and from chloroform vapor by dry caoutchouc. This method of obtaining fluoroform upon closer consideration is found to possess many drawbacks. The reaction between the fluorid of silver and iodoform when once set up takes place rapidly with development of strong heat, so that the chloroform is rapidly vaporized and the iodoform is partly sublimed and partly reduced to the state of decomposition products, ranging down to free iodin, which render the product impure. With very small charges it is possible by employing an inordinately large cooling-surface to retain the liquid and solid decomposition products behind the cooling-tube, which is surrounded with freezing mixture; but the last traces of chloroform and iodoform cannot be removed even by subsequent agitation with dry caoutchouc. In the purification of the fluoroform gas the enormous absorptive capacity of the same for substances having an odor—such as rubber, chloroform, fluoro-iodoform, &c.—constitutes a difficulty, these substances being distinctly identifiable by their odor after careful purification of the gas.

The present invention relates to a method of producing fluoroform on a large scale. By this invention a slow and regular current of fluoroform gas can be obtained which is completely free from impurities, so that no obstacle to the general employment of fluoroform and utilization of its valuable specific properties any longer exists.

The invention consists, substantially, in allowing fluorid of silver and iodoform to react with each other in the presence of a suitable medium, the object of this medium being to regulate the resulting current of fluoroform gas and to render it possible for the operation to take place at a suitably low temperature in order to avoid vaporization of the iodoform and in this way to obtain a product as pure as possible. As such a medium there may be employed sand, powdered glass, or other similar substance having no direct part in the reaction. The action can be still increased if the evolution of the fluoroform be effected in the presence of water, and in this case it is possible to so conduct the operation that chemically-pure fluoroform completely free from air is obtained. The water in this case serves both as a sealing liquid and at the same time as cooling-water for the reaction mixture, so that overheating and consequent liberation of any decomposition products which would render the fluoroform impure are made impossible.

The employment of chloroform is altogether omitted according to the present invention.

The following examples will serve to illustrate the invention.

Example 1: One kilogram each of iodoform and fluorid of silver are intimately mixed with sand and then placed in a retort and warmed on the water-bath. The reaction commences at about 40° centigrade and continues quite gradually to the end without necessity for assistance by further supply of heat. The liberated fluoroform passes first through a system of wash vessels containing alcohol, where it is freed from the odor of iodoform and such like iodin compounds, and then to free it from any carbonic oxid it may contain it is led to a second wash system filled with cuprous chlorid. From this the fluoroform issues chemically pure and is collected over water. The yield of pure fluoroform is almost quantitative. The advantages of this method over Meslanss' are obvious. The slow conversion of fluorid of silver and iodoform, which can be regulated at will according to the proportion of the admixed sand, entirely excludes by-reactions, so that the transformation into fluoroform occurs almost quantitatively. The small traces of impurities which adhere to the fluoroform as it leaves the vessel in which the reaction takes place are readily and completely removed in the wash vessels before mentioned, and the finished fluoroform gas passes in an analytically-pure state into the gasometer, which is filled with water as a sealing liquid.

Example 2: For the preparation of a chemically-pure fluoroform free from air the apparatus shown in one convenient modification in the accompanying drawing may advantageously be employed, the method of procedure being as follows:

The drawing shows in diagrammatic vertical sectional views one convenient arrangement of apparatus for carrying out the process.

The generating-receptacle A is filled to about half its height stratawise with alternate layers of iodoform and fluoride of silver, a layer of sand being interposed between each. All air is then expelled by filling the receptacle up with water. The cocks $a$ and $b$ are closed, while the cock leading to the reservoir R is allowed to remain open. As soon as the aqueous solution of fluorid of silver has penetrated through the sand to the first iodoform layer the evolution of the fluoroform begins. The gas collects in the upper part of the receptacle A and forces a corresponding volume of water into the reservoir R. When the generating-receptacle has been thus placed under fluoroform gas to the required height, the reservoir R is shut off, the cock $b$ is opened, admitting the fluoroform to the wash vessel B, which is completely filled with cuprous-chlorid solution, and, finally, the gas is admitted by the cock $c$ to the wash vessel C, which is filled with water. The wash vessels B and C are preferably each provided with water-reservoirs R' R'', similar in object and arrangement to the reservoir R. Then the pipe connected to the gasometer D, which pipe, like all the other leading tubes, is filled with water, is opened, and the chemically-pure fluoroform gas free from air is collected in the gasometer. The generation from the beginning to the end is regular and quiet and can be regulated at will by mixing the iodoform with sand for the better penetration of the aqueous solution of fluorid of silver. The water, which is employed principally as a sealing liquid in the generating-container, acts simultaneously as a cooling medium for the reaction mixture, so that this process of production excludes all overheating, and consequently all impurities due to decomposition products.

The technical advantage of the method described lies in the direct obtainment of chemically-pure fluoroform free from air and in the extremely-simple manipulation of the apparatus, which may be of any desired dimensions.

What I claim, and desire to secure by Letters Patent of the United States, is—

1. The method of producing fluoroform which consists in causing fluorid of silver to react with iodoform in the presence of inert material having no part in the reaction, whereby the temperature is regulated and a slow and regular current of fluoroform gas is liberated at a suitably low temperature, substantially as described.

2. The method of producing fluoroform which consists in warming an intimate admixture of iodoform, fluorid of silver and inert granular material, substantially as described.

3. The method of producing fluoroform, which method consists in submitting fluorid of silver and iodoform together with an inert medium, to the action of water, whereby the water dissolves the fluorid of silver and facilitates the action thereof upon the iodoform, and at the same time serves as a sealing liquid and cooling medium for the reaction mixture, a regular current of chemically-pure fluoroform free from air being obtained, substantially as described.

In testimony whereof I have hereunto set my hand in the presence of two witnesses.

FRIEDRICH VALENTINER.

Witnesses:
WILHELM GIEPEL,
RUDOLPH FRICKE.